(12) United States Patent
Chen et al.

(10) Patent No.: US 10,007,841 B2
(45) Date of Patent: Jun. 26, 2018

(54) HUMAN FACE RECOGNITION METHOD, APPARATUS AND TERMINAL

(71) Applicant: Xiaomi Inc., Beijing (CN)

(72) Inventors: Zhijun Chen, Beijing (CN); Pingze Wang, Beijing (CN); Qiuping Qin, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days. days.

(21) Appl. No.: 15/195,368

(22) Filed: Jun. 28, 2016

(65) Prior Publication Data

US 2017/0053156 A1 Feb. 23, 2017

(30) Foreign Application Priority Data

Aug. 21, 2015 (CN) .......................... 2015 1 0520457

(51) Int. Cl.
*G06K 9/36* (2006.01)
*G06K 9/00* (2006.01)
*G06K 9/32* (2006.01)
*G06K 9/62* (2006.01)

(52) U.S. Cl.
CPC ..... *G06K 9/00288* (2013.01); *G06K 9/00234* (2013.01); *G06K 9/00248* (2013.01); *G06K 9/32* (2013.01); *G06K 9/627* (2013.01); *G06K 9/6262* (2013.01)

(58) Field of Classification Search
CPC ........... G06K 9/00288; G06K 9/00295; G06K 9/00228–9/00261
See application file for complete search history.

(56) References Cited

U.S. PATENT DOCUMENTS

| 2006/0034602 A1 | 2/2006 | Fukui | |
|---|---|---|---|
| 2007/0274573 A1 | 11/2007 | Hori | |
| 2012/0114172 A1* | 5/2012 | Du | G06K 9/00248 382/103 |
| 2013/0293456 A1* | 11/2013 | Son | G06F 3/013 345/156 |

FOREIGN PATENT DOCUMENTS

| CN | 101488181 A | 7/2009 |
|---|---|---|
| CN | 102096802 A | 6/2011 |
| CN | 102270308 A | 12/2011 |
| CN | 105095881 A | 11/2015 |
| JP | 2006-087083 A | 3/2006 |
| JP | 2008-181439 A | 8/2008 |
| KR | 10-2009-0085328 A | 8/2009 |
| KR | 10-2010-0113651 A | 10/2010 |

OTHER PUBLICATIONS

Machine Translation of JP2008181439A, Inventor Hideto Fujita et al., published Aug. 7, 2008, 20 pages total. (Year: 2008).*

(Continued)

*Primary Examiner* — Brian Werner
(74) *Attorney, Agent, or Firm* — Brinks, Gilson & Lione

(57) ABSTRACT

A facial recognition solution is disclosed that includes adding a specified numeric pixels to an edge area of a digital image to acquire an enhanced digital image and then performing a facial recognition process on the enhanced digital image to determine a human face from the digital image.

15 Claims, 12 Drawing Sheets

(56) References Cited

OTHER PUBLICATIONS

Extended European Search Report dated Jan. 12, 2017 for European Application No. 16174462.8, 8 pages.
Han, Chin-Chuan et al., "Fast Face Detection via Morphology-Based Pre-Processing," Pattern Recognition, vol. 33, No. 10, 2000, pp. 1701-1712.
International Search Report and Written Opinion dated May 23, 2016 for International Application No. PCT/CN2015/099696, 13 pages.
Wei, Yu et al., "FGPA Implementation of Adaboost Algorithm for Detection of Face Biometrics," 2004 IEEE International Workshop on Biomedical Circuits & Systems, IEEE, 2004, 4 pages.
Office Action dated Jun. 2, 2017 for Korean Application No. 10-2016-7015669, 11 pages.
Office Action dated Dec. 13, 2017 for Japanese Application No. 2016-567408, 7 pages.

* cited by examiner

300

800

HUMAN FACE RECOGNITION METHOD, APPARATUS AND TERMINAL

CROSS-REFERENCE TO RELATED APPLICATIONS

This application claims priority to Chinese Patent Application Serial No. CN 201510520457.X, filed with the State Intellectual Property Office of P. R. China on Aug. 21, 2015, the entirety of which is hereby incorporated by reference herein.

TECHNICAL FIELD

The present disclosure relates to the field of image processing technology, and more particularly, to image processing for identifying desired content (e.g., human face) from a digital image.

BACKGROUND

As facial recognition technology continues to develop, facial recognition is being applied to a greater number of fields such as security access control, visual detection, image retrieval based on contents and next generation human-machine interface. As a result, the field of facial recognition for digital images has gained more attention from researchers.

In the related art, facial recognition for a human face may be implemented by analyzing facial features such as by taking a ratio of facial features (such as, eyes, nose, etc.) on the human face. However, if the human face is located at an edge area of an image such that the entire human face is not included in the image, it may be difficult to apply facial recognition techniques that rely on ratios of facial features as not all facial features may be included in the image.

SUMMARY

The present disclosure provides techniques for facial recognition on images that may not include image data representative of an entire face.

According to a first embodiment of the present disclosure, there is provided a computer-implemented human face recognition method, including: adding specified numeric pixels to an edge area of an original image to acquire an image to be processed; performing human face recognition on the image to be processed; and determining a human face in the original image according to a result of the human face recognition.

According to a second embodiment of the present disclosure, there is provided a computing device, including: a processor; and a memory for storing instructions executable by the processor; in which the processor is configured to execute the instructions to: add specified numeric pixels to an edge area of an original image to acquire an image to be processed; perform human face recognition on the image to be processed; and determine a human face in the original image according to a result of the human face recognition.

According to a third embodiment of the present disclosure, there is provided a non-transitory computer-readable storage medium having stored therein instructions that, when executed by a processor of a terminal, causes the terminal to perform a human face recognition method, the method including: adding specified numeric pixels to an edge area of an original image to acquire an image to be processed; performing human face recognition on the image to be processed; and determining a human face in the original image according to a result of the human face recognition.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
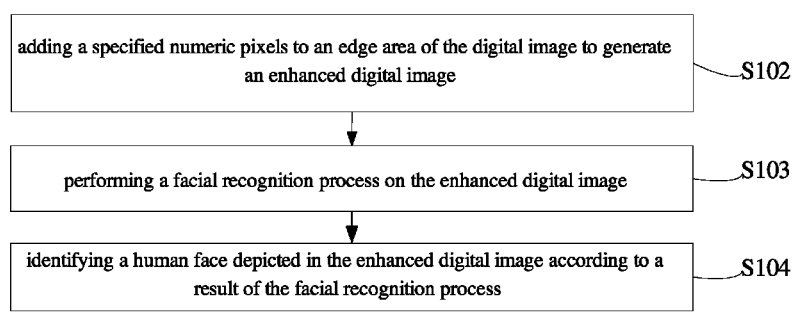
FIG. 1 is a flow chart showing a facial recognition method according to an illustrative embodiment.

Reference will be made in detail to embodiments of the present disclosure. Unless specified or limited otherwise, the same or similar elements and the elements having same or similar functions are denoted by like reference numerals throughout the descriptions. The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

FIG. 1 shows a flow chart 100 describing a computer-implemented facial recognition method that may be applied to recognize a human face in a digital image that contains image data representative of at least a portion of the human face according to an illustrative embodiment, where the method may be implemented on a device such as a computing device. The communication device may be a well-known computing system, environment, and/or configuration of hardware and software suitable for implementing features described herein such as, but not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like. As shown by flow chart 100 in FIG. 1, the human face recognition method may include the following processes described by S102 to S104.

At S102, specified numeric pixels may be added to an edge area of a digital image to generate an enhanced digital image that will be further processed according to the facial recognition method. The edge area may be determined to be an edge of the digital image that includes image data representative of at least a portion of a human face. The edge area may be determined based on a width and/or length of the digital image, where width and/or length information of the digital image is identified in accompanying data describing attributes of the digital image. It follows that the specified numeric pixels may be added to the edge area to assist in locating the face portion in the digital image.

The digital image may have, for example, four edges that define the borders of the digital image. The specified numeric pixels may be a predetermined number of one or more pixels having a predetermined pixel value. In addition or alternatively, the number of pixels that comprise the specified numeric pixels and/or the pixel value that comprise the specified numeric pixels may be determined based on the determined edge area and/or pixel values of pixels that comprise the determined edge area. For example, the number of pixels that comprise the specified numeric pixels and/or the pixel value that comprise the specified numeric pixels may be determined based on pixel values of pixels that correspond to image data representing a human face in the digital image.

At S103, a facial recognition process is performed on the enhanced digital image. The facial recognition process may be implemented according to known facial recognition processing that are based on identifying specific shapes within the digital image that are compared against known facial features or identifying specific shapes within the digital image and determining they satisfy predetermined criteria for matching a facial feature.

At S104, a human face in the enhanced digital image is identified according to a result of the facial recognition process.

In an embodiment, the human face recognition method may further include a step of acquiring the digital image prior to S102. For example, the digital image may be acquired from a storage medium or a memory According to the human face recognition method described by flow chart 100, after generating the enhanced digital image by adding the specified numeric pixels to the edge area of the digital image that includes image data representative of at least a portion of a human face, the facial recognition process is performed on the enhanced digital image to identify the human face in the enhanced digital image. By adding the specified numeric pixels to the edge area of the digital image that includes image data representative of at least a portion of a human face, the digital image may be extended such that the human face may be identified from the enhanced digital image even when the human face is located in the edge area of the digital image such that at least a portion of the human face is missing from the digital image. The addition of the specified numeric pixels to the edge area thus generates the enhanced digital image that improves the accuracy of recognizing the human face even when a portion of the human face is missing from the digital image.

According to an embodiment, adding the specified numeric pixels to the edge area of the digital image may include: acquiring a pixel value of each pixel in the edge area of the digital image; determining an edge area of the digital image includes a human face based on a pixel value of at least one pixel within the edge area satisfying a facial complexion pixel value threshold; and adding the specified numeric pixels to the edge area determined to include the human face.

According to another embodiment, performing the facial recognition process on the enhanced digital image may include: analyzing a plurality of sub-images from the enhanced digital image; and determining whether each sub-image includes at least a portion of a human face depicted in the enhanced digital image using a pre-trained adaptive boost human face classifier. The adaptive boost human face classifier is a machine learning tool that may be used in conjunction with other facial recognition learning processes to improve the performance of the facial recognition learning algorithm. For example, the adaptive boost human face classifier may be applied to the results of a facial recognition learning algorithm by combining weighted sums of the outputs from the facial recognition learning algorithm to generate the adaptive boost human face classifier. The adaptive boost human face classifier may then be used by the facial recognition learning algorithm to determine whether a specific area within the enhanced digital image includes a human face or not.

In another embodiment, the plurality of sub-images may be acquired from the enhanced digital image using a sliding window tool. For example, sub-images may be acquired by shifting a sliding window across the enhanced digital image and selecting the image data covered by the sliding window at different positions of the sliding window as the sub-images. In one embodiment, the sliding window may have a rectangular shape, although it will be understood that the sliding may have other shapes having enclosed boundaries such as, for example, a circular shape. The sliding window may be shifted across the enhanced image in a horizontal direction and/or a vertical direction and may be shifted across the enhanced image incrementally with or without a specified amount of overlap. Also, the sliding window may complete one or more passes across the entire enhanced image, and the size and/or shape of the sliding window may be different for different passes.

In additional or in the alternative to using a sliding window, sub-images may be acquired by zooming into a portion of the enhanced image one of more times to acquire a plurality of zoomed images within a zoomed viewing window that include image data from the enhanced digital image that has been zoomed to different degrees. Sub-images may then be acquired by trimming portions of the enhanced digital image not included in the zoomed viewing window.

In another embodiment, the pre-trained adaptive boost human face classifier may be used to form a cascade of multistage classifiers that may be adapted and subsequently referenced in a plurality of sub-images in determining whether each sub-image includes a portion of the human face. Using the pre-trained adaptive boost human face classifier may include: determining whether each sub-image includes a human face portion in a stage by stage manner, starting from the first stage the multistage classifier to the last stage of the multistage classifier in the pre-trained adaptive boost human face classifier; and determining that the sub-image includes a human face portion when each results output from all stages of the multistage classifiers indicates that the sub-image includes a human face portion.

In another embodiment, identifying the human face in the enhanced digital image according to the result of the human face recognition may include: determining a location of a sub-image that includes a human face portion in the digital image, when the sub-image that includes a human face portion is located in the plurality of sub-images that comprise the enhanced digital image; and identifying the human face in the enhanced digital image based on the location of the sub-image that includes a human face portion.

Alternative embodiments of the present disclosure may be formed by combining alternative technical solutions above in any way, which will not be elaborated herein.

Figure 2:
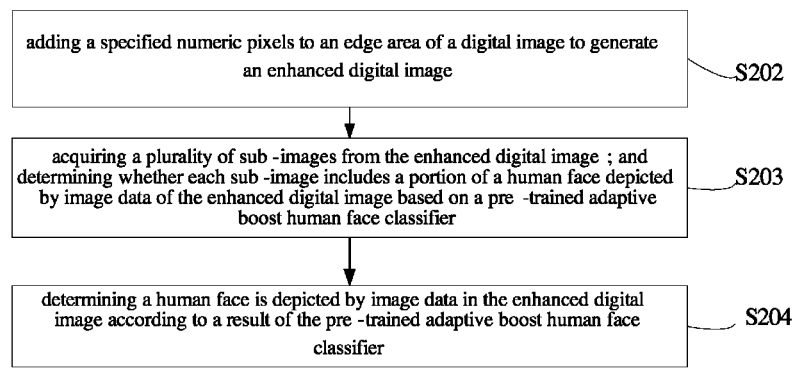
FIG. 2 is a flow chart showing a facial recognition method according to an illustrative embodiment.

FIG. 2 shows a flow chart 200 describing a human face recognition method that may be applied to recognize a human face depicted in a digital image according to an illustrative embodiment, where the method may be implemented on a device such as a communication device. As shown by flow chart 200 in FIG. 2, the human face recognition method provided by embodiments of the present disclosure may include the following processes described by S202 to S204.

Prior to performing the step of S202, the digital image may be acquired.

The digital image is an image on which the human face recognition method will be performed to determine whether a depiction of a human face is included, and to further determine an area of the digital image that includes the depiction of the human face.

For example, a digital image stored and acquired from a digital media storage device may be used as the digital image. The digital image may also be downloaded from the Internet or acquired by scanning an image with a scanner. Moreover, an image photographed by a digital camera may be used as the digital image.

At S202, a specified numeric pixels may be added to an edge area of the original image to generate an enhanced digital image.

Figure 3:
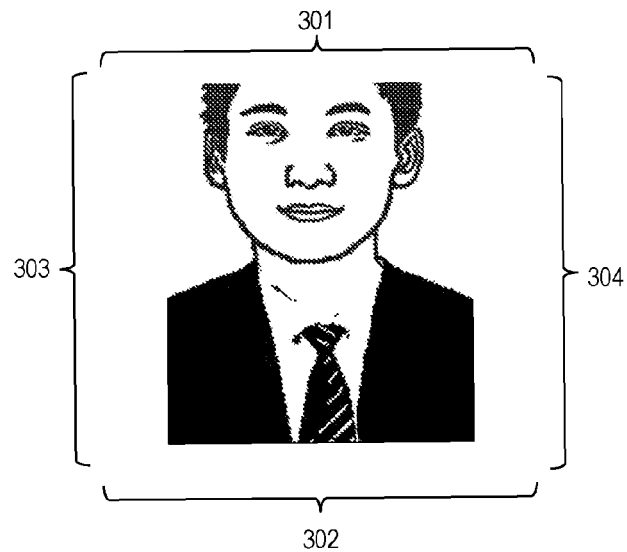
FIG. 3 is a schematic diagram of a digital image according to an illustrative embodiment.

The digital image be comprised of a plurality of pixels, where an edge area refers to pixels located at four outermost sides of the digital image. For example, FIG. 3 shows an exemplary digital image 300 that includes a depiction of a human face. The digital image 300 includes a top edge area 301, a bottom edge area 302, a left edge area 303, and a right edge area 304. The human face in the digital image 300 is located in the top edge area 301 of the digital image. When the human face is located in an edge (e.g., top edge area 301) of the digital image 300, the human face may not be easily recognizable by a facial recognition process. To assist modifying the digital image 300 to increase a likelihood of a successful facial recognition process, a specified numeric pixels may be added to the edge area of the digital image 300. According to some embodiments, the specified numeric pixels may only be added to an edge area of the digital image 300 determined to include at least a portion of the human face. By adding the specified numeric pixels to the edge area, an enhanced digital image may be acquired.

Figure 4:
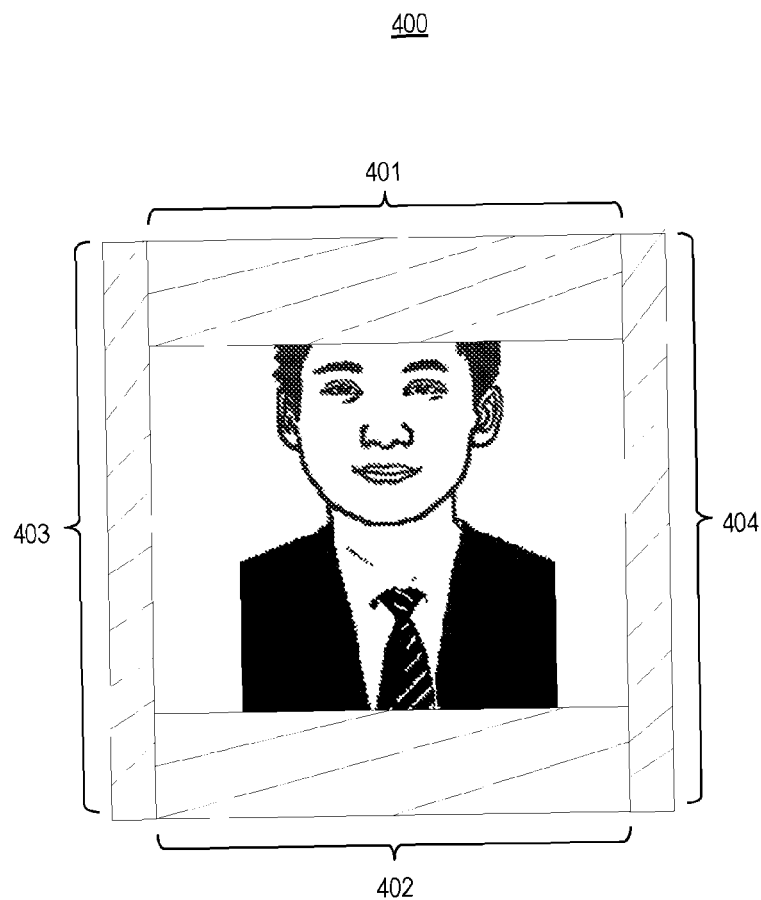
FIG. 4 is a schematic diagram of a digital image to be processed according to an illustrative embodiment.

FIG. 4 shows an exemplary enhanced digital image 400 where a specified numeric pixels have been added to all four edge areas of the digital image 300. For example, a first specified numeric pixels 401 is added to the top edge area 301, a second specified numeric pixels 402 is added to the bottom edge area 302, a third specified numeric pixels 403 is added to the left edge area 303, and a fourth specified numeric pixels 404 is added to the right edge area 304.

For example, two pixels, five pixels or ten pixels may be added to the periphery of each pixel at the outermost sides.

Additional, all the pixels added to the edge areas of the digital image 300 as part of the specified numeric pixels may have the same pixel value, i.e., all the pixels are in the same color which may be interpreted as an indicator to determine the location of the human face in the digital image. The same color may be white, black or other colors, which is not limited in embodiments of the present disclosure. Since pixels in the same color have the same pixel value, when the added specified numeric pixels are pixels with the same color, and when pixels in a certain area of the enhanced digital image are determined to share the same pixel value during the human face recognition process, these pixels may be determined to be the added specified numeric pixels, such that it is unnecessary to execute overmuch recognition procedures, thus the speed of recognition is high.

For instance, when adding the specified numeric pixels to the edge areas of the digital image 300, the specified numeric pixels may be added to all of the four edge areas of the digital image 300. Of course, the specified numeric pixels added to each edge area may be unique. For example, the specified numeric pixels added to the left edge area 303 may be different from the specified numeric pixels added to the right edge area 304. However, after adding the specified numeric pixels to the edge area of the digital image 300, the facial recognition process applied to the digital image 300 may be made more efficient. To minimize the calculations involved in the facial recognition process for the digital image, the specified numeric pixels is added to the edge area in which the human face is determined to be located in an area.

According to an exemplary embodiment, a pixel value for a facial complexion pixel (a pixel included in a depiction of the human face in the digital image) may have a specific value or may be within a predetermined value range of pixel values. It follows that the human face may be located within the digital image based on the identification of an edge area that includes one or more facial complexion pixels. Adding the specified numeric pixels to the edge area of the digital image may include, but is not limited to, the following processes S2021-S2023. Processes S2021-S2023 may be a collection of processes that comprise the process at S202 described in flow chart 200.

At S2021, a pixel value of each pixel in the edge area of the digital image may be obtained.

For instance, the pixel value of each pixel in the edge area may be acquired by determining a RGB color value of each pixel. The determination of the RGB color value of each pixel may be implemented by a color sensor, or may be a predetermined color value assigned to the pixels of the digital image. Although the RGB color value is reference for exemplary purposes, pixel values corresponding to other color spaces (e.g., YCbCr or CMYK) may also be used.

At S2022, an edge area of the digital image is analyzed to determine whether the edge area includes a facial complexion pixel, where the facial complexion pixel is a pixel having a pixel value that satisfies a preset pixel value.

According to some embodiments, the pixel value of each pixel in the edge areas may be compared to the preset pixel value to identify one or more facial complexion pixels, and then the edge area determined to include the facial complexion pixel may be identified according to the comparison.

For instance, when comparing the pixel value of any pixel in the edge areas with the preset pixel value for the facial complexion pixel, if a difference between the pixel value of a current pixel being analyzed and the preset pixel value for the facial complexion pixel is not greater than a first preset threshold, the current pixel being analyzed may be determined to be a facial complexion pixel. Specific numeric value of the first preset threshold is not limited in embodiments of the present disclosure. However, in order to accurately recognize whether a current pixel being analyzed is the facial complexion pixel, the first preset threshold may be set to a small value.

For instance, the determination of whether the edge area includes a facial complexion pixel may be made according to a ratio of facial complexion pixel that takes the ratio of facial complexion pixels that have been identified in the edge area being analyzed versus non-facial complexion pixels in the edge area being analyzed. If the ratio is greater than a second preset threshold, it is determined that facial complexion pixel exists in the edge area, otherwise it is determined that the facial complexion pixel is absent in the edge area. Specific numeric value of the second preset threshold may be set as needed.

At S2023, the specified numeric pixels are added to the edge area determined to include at least one of the facial complexion pixels. By adding the specified numeric pixels to the digital image, an enhanced digital image is generated.

In other words, when adding the pixels to edge area of the original image, the specified numeric pixels may be added to the edge area determined to include the facial complexion pixel. For example, if the facial complexion pixel exists in the top edge area 301 of the digital image 300, the specified numeric pixels may be added to the top edge area 301, so as to reduce the calculations made for the facial recognition process.

At S203, a plurality of sub-images are extracted from the enhanced digital image, and a determination is made as to whether each sub-image is a human face sub-image that includes at least a portion of the human face by using a pre-trained adaptive boost human face classifier.

In embodiments of the present disclosure, the facial recognition process on the enhanced digital image may be implemented by firstly extracting the plurality of sub-images from the enhanced digital image and then determining whether each sub-image is the human face sub-image.

Extracting the plurality of sub-images from the enhanced digital image may be accomplished according to one, or both, of the following two options.

First option: traversing the enhanced digital image for a plurality of times using sliding windows, defining a sub-image of the enhanced digital image as an image area of the enhanced digital image encompassed by the boundaries created by the sliding windows for each traversing iteration, in which a size and shape of the sliding windows used in any two traversing iteration are different.

Figure 5:
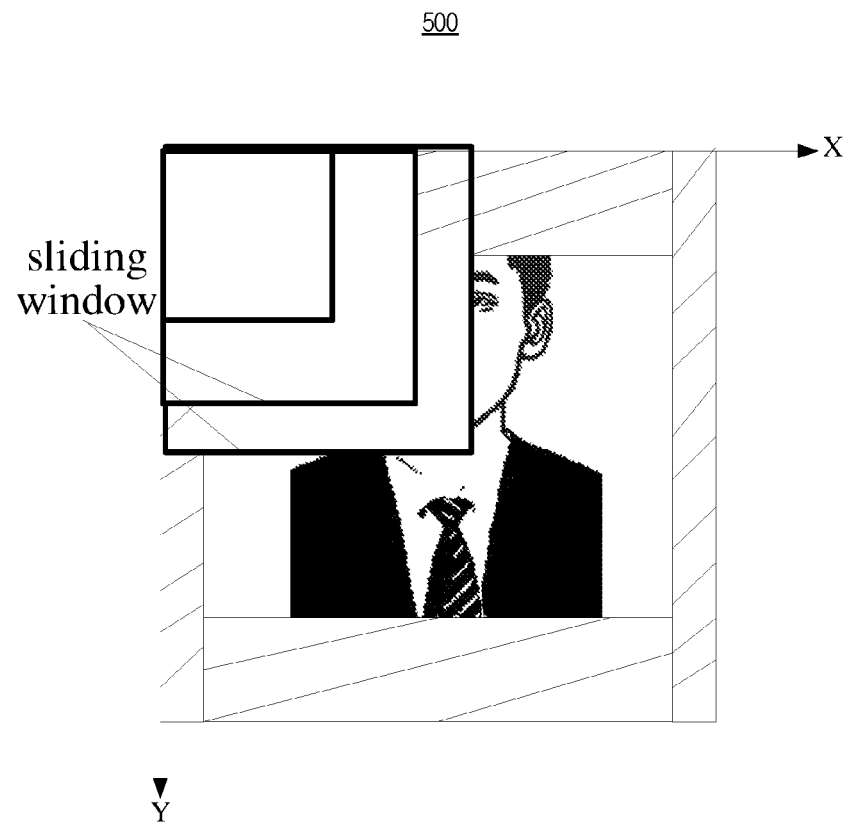
FIG. 5 is a schematic diagram of traversing a digital to be processed using sliding windows in different sizes according to an illustrative embodiment.

For example, for a certain iteration of traversing the image to be processed, the size of sliding window is 3*3; while for the next time of traversing the enhanced digital image, the size of a sliding window may be 5*5 units, where a unit may be a pixel or other measurable unit. As shown in FIG. 5, an exemplary enhanced digital image 500 that includes the specified numeric pixels may be traversed a plurality of times such that each iteration results in a different sized sliding window. Each square shape outlined in FIG. 5 represents a unique iteration of a sliding window.

When traversing the enhanced digital image using a sliding window in any size, the sliding window traverses the image to be processed by a specified step size in a horizontal direction (X direction) and a vertical direction (Y direction) of the enhanced digital image. As the sliding window moves one step size in the X direction or Y direction, the sliding window moves to a new position of the enhanced digital image. Each position defines one image range, which is the sub-image of the image to be processed. The specified step size may be one pixel, two pixels or the like.

Second option: zooming the enhanced digital image a plurality of times to acquire a plurality of sub-images from the enhanced digital image, where each unique sub-image is extracted by trimming the enhanced digital image into different sized sub-images.

For each time that the enhanced digital image is zoomed, a sub-image of the enhanced digital image may be extracted in a certain size. Accordingly, a plurality of sub-images may be extracted from the enhanced digital image according to the zooming process. For example, the sub-image that is extracted from the enhanced digital image may be of a specified size, such as 3*3 pixels, 5*5 pixels, or the like.

Figure 6:
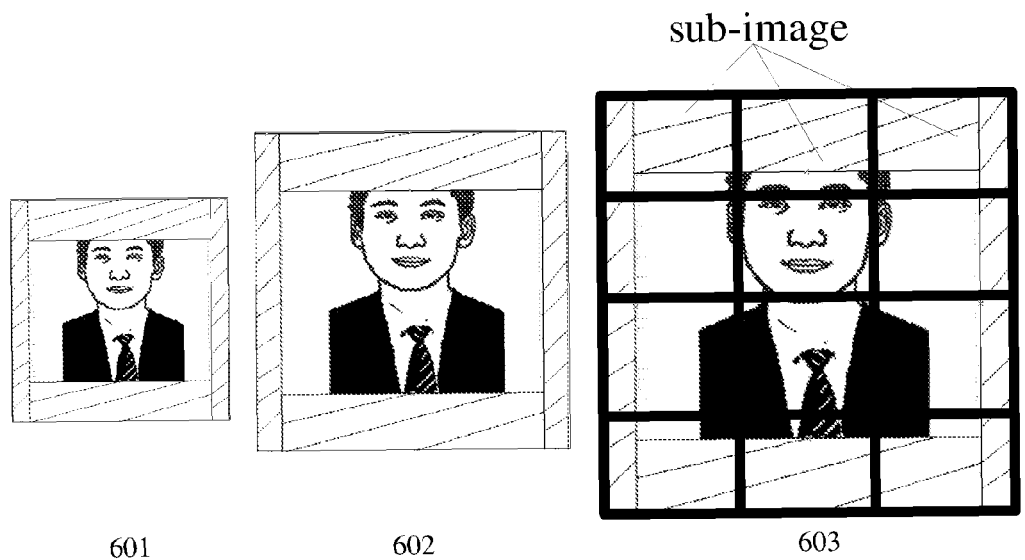
FIG. 6 is a schematic diagram of digital images to be processed in different sizes according to an illustrative embodiment.

As shown in FIG. 6, three different exemplary enhanced digital images in different sizes is shown. Enhanced digital image 601 is shown to be smaller than enhanced digital image 602, and enhanced digital image 603 is shown to be larger than enhanced digital image 601 and enhanced digital image 602. Further, enhanced digital image 603 is shown to include a plurality of sub-images as defined by the twelve squares that are outlined within the enhanced digital image 603.

Further, determining whether each sub-image is a human face sub-image that includes at least a portion of a human face may be implemented by a pre-trained human face classifier. For example, the pre-trained human face classifier may be a Support Vector Machine human face classifier, a neural network human face classifier or an adaptive boost (Adaboost) human face classifier or the like. For convenience of description, in embodiments of the present disclosure, the pre-trained human face classifier being Adaboost human face classifier is taken as an example to explain the sequent step of recognizing the human face.

In a possible implementation, in order to improve the precision of recognizing the human face, in embodiments of the present disclosure, the Adaboost human face classifier is formed as a cascade of multistage classifier stages. Each classifier stage in the Adaboost human face classifier is configured to judge whether a sub-image currently being analyzed is a human face sub-image. The resulting output from each classifier stage is "0" or "1". When the output result is "1" this indicates that the classifier stage determines that the sub-image is the human face sub-image. When the output result is "0" this indicates that the classifier stage determines that the sub-image is not the human face sub-image. This may continue through each of the classifier stages of the Adaboost human face classifier Each classifier stage in the Adaboost human face classifier may be a strong classifier that combines a weighted sum of a plurality of weak classifiers. The training of each classifier stage in the Adaboost human face classifier may be implemented by training a plurality of weak classifiers included in a particular classifier stage. The resulting output from the classifier stage is determined according to the data processing, or date processing, of all the weak classifiers included in the classifier stage. Regarding this training of the Adaboost human face classifier and determining the resulting output from each classifier stage, reference is made to the existing content about the Adaboost human face classifier, which is not elaborated in embodiments of the present disclosure.

Figure 7:
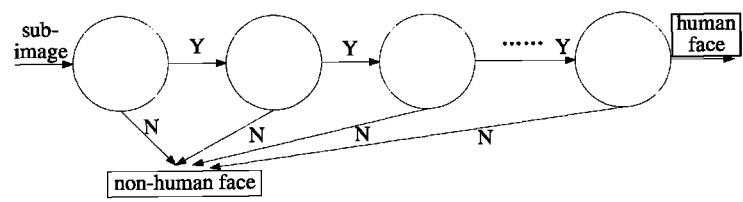
FIG. 7 is a schematic diagram of an Adaboost human face classifier according to an illustrative embodiment.

The number of classifier stages included in the Adaboost human face classifier is not limited in embodiments of the present disclosure. In order to enable the recognition to be more accurate, the Adaboost human face classifier may include five classifier states, eight classifier states, or more. As shown in FIG. 7, a schematic diagram of an Adaboost human face classifier is shown. Each circle area in FIG. 7 represents a unique classifier stage.

Based on this, when determining whether each sub-image of the enhanced digital image is a human face sub-image using the pre-trained adaptive boost human face classifier, for each sub-image, the pre-trained adaptive boost human face classifier is trained in a stage by stage manner starting from the first classifier stage to the last classifier stage in the pre-trained Adaboost human face classifier, so as to determine whether the sub-image being processed is the human face sub-image. When each resulting output from all the classifier states indicates that the sub-image is the human face sub-image, the sub-image is determined to be the human face sub-image. If a result from any of the classifier states indicates that the sub-image is not the human face sub-image, the sub-image is determined not to be a human face sub-image.

Specifically, for each sub-image, the sub-image is input into the Adaboost human face classifier from the first classifier stage, and when the first classifier stage determines that the sub-image is the human face sub-image, the sub-image is input into the second classifier stage, such that the second classifier stage determines whether the sub-image is the human face sub-image that includes a depiction of a portion of a human face, and so on, until the last classifier stage in the cascade of classifiers is processed. When the first classifier stage determines that the sub-image is not the human face sub-image, the first classifier stage acquires the next sub-image of the enhanced digital image for recognition processing.

It should be noted that, according to the pre-trained human face classifier, when a human face is located in an edge area of the digital image, the human face located in the edge area may not be recognized. However, the same human face located in the edge area of the digital image may be recognized successfully when shielded. In embodiments of the present disclosure, the specified numeric pixels may be added to the edge area of the digital image, so that the human face located in the edge area is equivalent to be shielded by the added pixels, such that the human face located in the edge area may be recognized by the pre-trained human face classifier, thus improving the accuracy of recognizing the human face located in the edge area.

At S204 of flow chart 200, a determination as to whether a human face is depicted in the enhanced digital image is made according to a result of the human face recognition.

After recognizing whether each sub-image is the human face sub-image, the sub-image including at least a portion of the human face may be determined according to the result of the human face recognition. However, in order to determine which edge area includes at least a portion of the human face in the enhanced digital image, it may be required to determine the human face in the original image according to the sub-image belonging to the human face.

For instance, a step of determining the human face in the enhanced digital image according to the result of the human face recognition includes, but is not limited to: determining a position of a human face sub-image that includes at least a portion of the human face in the enhanced digital image when the human face sub-image is included in the plurality of sub-images of the enhanced digital image, and then determining the human face in the enhanced digital image according to the position of the human face sub-image in the enhanced digital image. Accordingly, a location of the human face depicted within the enhanced digital image may be determined.

In a possible implementation, for any sub-image whose recognition indicates that it is the human face sub-image, when acquiring the position of the sub-image in the enhanced digital image, a pixel value of each pixel in the sub-image is extracted, and a pixel value of each pixel in the new digital image is extracted, and then the pixel value of each pixel in the sub-image is compared with the pixel value of each pixel in the new digital image. If the pixel value of each pixel in one certain area of the new digital image is equal to the pixel value of each pixel in the sub-image, the position of the sub-image may be set in the new digital image. After positioning the sub-image in the original image, the human face in the new digital image may be determined to be the position of the sub-image in the original image.

Further, if the sub-image which is a human face sub-image does not exist in the plurality of sub-images of the enhanced digital image, it is determined that the digital image does not include the human face.

With the method provided by embodiments of the present disclosure, after acquiring the enhanced digital image by adding the specified numeric pixels to the edge area of the digital image, the human face recognition is performed on the enhanced digital image so as to determine the human face in the enhanced digital image. During the human face recognition, the edge area of the digital image is added with specified numeric pixels, equivalent to extending the digital image, such that a sub-image including the human face may be found in the extended image when the human face is located in the edge area of the digital image, thus ensuring that the human face located in the edge area of the digital image can be recognized, and further improving accuracy of recognizing the human face.

Figure 8:
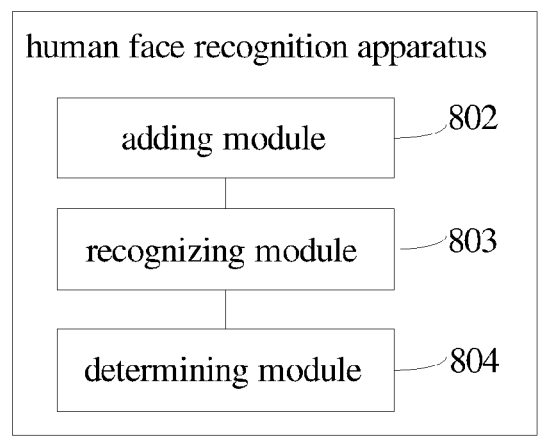
FIG. 8 is a block diagram of a facial recognition apparatus according to an illustrative embodiment.

FIG. 8 is a block diagram of a human face recognition apparatus 800 according to an illustrative embodiment. Referring to FIG. 8, the human face recognition apparatus 800 may include an adding module 802, a recognizing module 803 and a determining module 804.

The adding module 802 may be configured to add a specified numeric pixels to an edge area of the digital image to acquire an enhanced digital image.

The recognizing module 803 may be configured to perform human face recognition on the enhanced digital image acquired by the adding module 802.

The determining module 804 may be configured to determine a human face in the digital image according to a result of the human face recognition from the recognizing module 803.

In an embodiment, the human face recognition apparatus 800 may further include an acquiring module configured to acquire the digital image.

Figure 9:
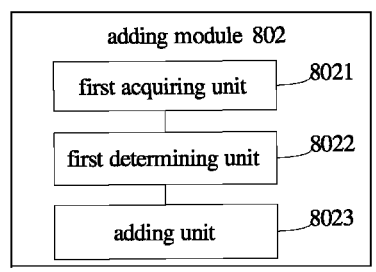
FIG. 9 is a block diagram of an adding module according to an illustrative embodiment.

In an embodiment referring to FIG. 9, the adding module 802 may include a first acquiring unit 8021, a first determining unit 8022 and an adding unit 8023.

The first acquiring unit 8021 may be configured to acquire a pixel value of each pixel in the edge area of the digital image.

The first determining unit 8022 may be configured to determine an edge area having a facial complexion pixel according to the pixel value of each pixel in the edge area acquired by the first acquiring unit 8021 and a preset pixel value for the facial complexion pixel.

The adding unit 8023 may be configured to add the specified numeric pixels to the edge area determined to include the facial complexion pixel by the first determining unit 8022.

Figure 10:
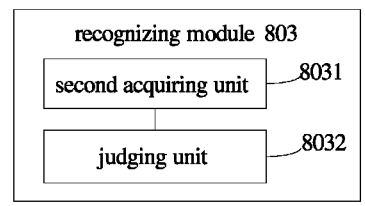
FIG. 10 is a block diagram of a recognizing module according to an illustrative embodiment.

In another embodiment, referring to FIG. 10, the recognizing module 803 may include a second acquiring unit 8031 and a judging unit 8032.

The second acquiring unit 8031 may be configured to acquire a plurality of sub-images of the enhanced digital image.

The judging unit 8032 may be configured to determine whether each sub-image acquired by the second acquiring unit 8031 is a human face sub-image using a pre-trained adaptive boost human face classifier.

In another embodiment, the second acquiring unit 8031 may be configured to acquire the plurality of sub-images from the enhanced digital image by using a sliding window tool. For example, sub-images may be acquired by shifting a sliding window across the enhanced digital image and selecting the image data covered by the sliding window at different positions of the sliding window as the sub-images. In one embodiment, the sliding window may have a rectangular shape, although it will be understood that the sliding may have other shapes having enclosed boundaries such as, for example, a circular shape. The sliding window may be shifted across the enhanced image in a horizontal direction and/or a vertical direction and may be shifted across the enhanced image incrementally with or without a specified amount of overlap. Also, the sliding window may complete one or more passes across the entire enhanced image, and the size and/or shape of the sliding window may be different for different passes.

In additional or in the alternative to using a sliding window, the second acquiring unit 8031 may be configured to acquire the plurality of sub-images from the enhanced digital image by zooming into a portion of the enhanced image one of more times to acquire a plurality of zoomed images within a zoomed viewing window that include image data from the enhanced digital image that has been zoomed to different degrees. Sub-images may then be acquired by trimming portions of the enhanced digital image not included in the zoomed viewing window.

In another embodiment, the pre-trained adaptive boost human face classifier may be formed as a plurality of cascading multistage classifiers, and the judging unit 8032 may be configured to: determine whether the sub-image is the human face sub-image according to a stage-by-stage manner starting from a first classifier stage to a last classifier stage in the pre-trained adaptive boost human face classifier; and determine that the sub-image is the human face sub-image when each of resulting outputs from all the classifier stages indicates that the sub-image is the human face sub-image.

Figure 11:
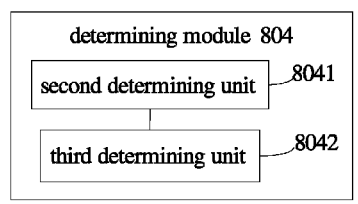
FIG. 11 is a block diagram of a determining module according to an illustrative embodiment.

In another embodiment, referring to FIG. 11, the determining module 804 may include: a second determining unit 8041 and a third determining unit 8042.

The second determining unit 8041 may be configured to determine a position of a sub-image which is the human face sub-image in the digital image, when the sub-image which is the human face sub-image is included in the plurality of sub-images of the enhanced digital image.

The third determining unit 8042 may be configured to determine the human face in the original image according to the position of the sub-image which is the human face sub-image in the digital image.

With respect to the apparatus in the above embodiments, the specific manners for performing operations for individual modules therein have been described in detail in the embodiments regarding the human face recognition method, which will not be elaborated herein. Alternative embodiments of the present disclosure may be formed by combining alternative technical solutions above in any way, which will not be elaborated herein. The modules described herein may include a combination of hardware, software, and circuitry for implementing the processes described as being implemented by the respective modules.

Figure 12:
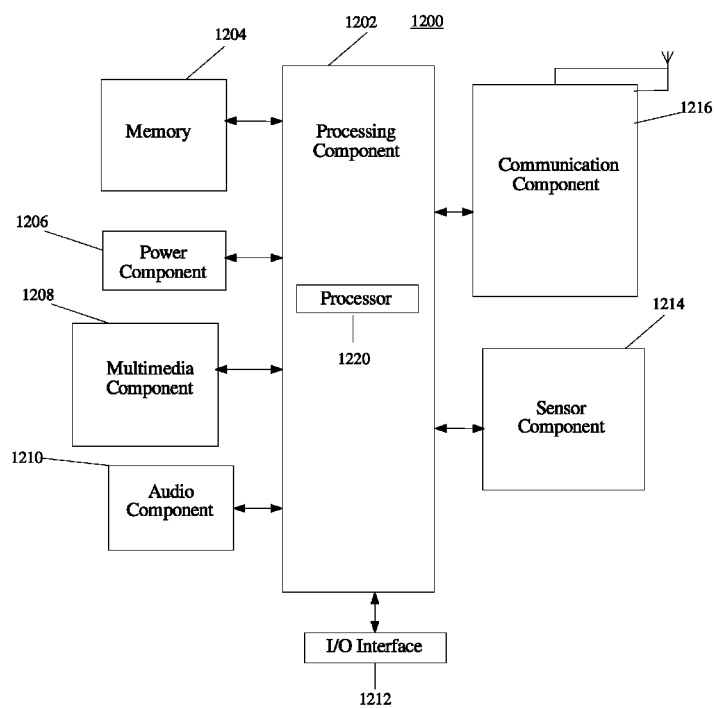
FIG. 12 is a block diagram of a computing device according to an illustrative embodiment.

FIG. 12 is a block diagram of a device 1200 according to an illustrative embodiment, and the device 1200 is configured to execute the human face recognition method provided in embodiments described herein (e.g., embodiments described by FIGS. 1 and 2). For example, the device 1200 may be a mobile phone, a computer, a digital broadcast terminal, a messaging device, a gaming console, a tablet, a medical device, exercise equipment, a personal digital assistant, and the like.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 may include a power management system, one or more power sources, and any other components associated with the generation, management, and distribution of power in the device 1200.

The multimedia component 1208 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the device 1200. For instance, the sensor component 1214 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 can access a wireless network based on a communication standard, such as WiFi, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the human face recognition method provided by embodiments corresponding to FIG. 1 and FIG. 2.

In illustrative embodiments, there is also provided a non-transitory computer-readable storage medium including instructions, such as a memory 1204 including instructions, the instructions may be executable by the processor 1220 in the device 1200, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for implementing facial recognition on a digital image that contains image data representative of at least a portion of a human face, comprising:
   determining that an edge area of the digital image includes image data representative of a portion of a human face;
   adding a specified numeric pixels to the edge area of the digital image, the specified numeric pixels each having a same pixel value as each other, wherein the same pixel value is determined based on pixel values corresponding to image data representing the human face;
   generating an enhanced digital image based on adding the specified numeric pixels to the edge area of the digital image;
   implementing a facial recognition process on the enhanced digital image; and
   determining an identity of a human face in the new digital image according to a result of the facial recognition process.

2. The method of claim 1, wherein adding the specified numeric pixels to the edge area of the digital image comprises:
   acquiring a pixel value of each pixel in the edge area of the digital image;
   determining an edge area includes a facial complexion pixel when at least one pixel included in the edge area has a pixel value that satisfies a preset pixel value for being identified as the facial complexion pixel; and
   adding the specified numeric pixels to the edge area determined to include the facial complexion pixel.

3. The method of claim 2, wherein performing the facial recognition process on the enhanced digital image comprises:
   acquiring a plurality of sub-images from the enhanced digital image; and
   determining whether each sub-image of the plurality of sub-images is a human face sub-image according to a pre-trained adaptive boost human face classifier.

4. The method of claim 1, wherein performing the facial recognition process on the enhanced digital image comprises:
   extracting a plurality of sub-images from the enhanced digital image; and
   determining whether each sub-image of the plurality of sub-images is a human face sub-image according to a pre-trained adaptive boost human face classifier.

5. The method of claim 4, wherein acquiring the plurality of sub-images from the enhanced digital image comprises:
   traversing the enhanced digital image and defining an image area of a sub-image based on a boundary of a sliding window, wherein each traversal iteration of the sliding window results in a different sized sliding window boundary.

6. The method of claim 4, wherein the pre-trained adaptive boost human face classifier is formed as a cascade of a plurality of classifier stages;
   wherein determining whether each sub-image is the human face sub-image according to the pre-trained adaptive boost human face classifier comprises:
      determining whether the sub-image is the human face sub-image in a stage by stage manner starting from a first classifier stage to a last classifier stage in the pre-trained adaptive boost human face classifier; and
      determining that the sub-image is the human face sub-image when each resulting output from all classifier stages of the pre-trained adaptive boost human face classifier indicates that the sub-image is the human face sub-image.

7. The method of claim 4, wherein determining the identity of the human face in the digital image according to the result of the facial recognition process comprises:
   when a sub-image includes a human face sub-image, determining a position of the sub-image including the human face sub-image in the digital image; and
   recognizing a human face in the digital image according to the position of the sub-image which is the human face sub-image in the digital image.

8. A device for implementing facial recognition on a digital image, comprising:
   a processor; and
   a memory configured to store instructions executable by the processor;
   wherein the processor is configured to execute the instructions to:
      determine that an edge area of the digital image includes image data representative of a portion of a human face;
      add a specified numeric pixels to the edge area of the digital image, the specified numeric pixels each having a same pixel value as each other, wherein the same pixel value is determined based on pixel values corresponding to image data representing the human face;
      generate an enhanced digital image based on adding the specified numeric pixels to the edge area of the digital image;
      implement a facial recognition process on the enhanced digital image; and
      determine an identity of a human face in the enhanced digital image according to a result of the facial recognition process.

9. The device of claim 8, wherein the processor is configured to execute the instructions to add the specified numeric pixels to the edge area of the digital image by:
   acquiring a pixel value of each pixel in the edge area of the digital image;
   determining an edge area includes a facial complexion pixel when at least one pixel included in the edge area has a pixel value that satisfies a preset pixel value for being identified as the facial complexion pixel; and
   adding the specified numeric pixels to the edge area determined to include the facial complexion pixel.

10. The device of claim 9, is configured to execute the instructions to perform the facial recognition process on the enhanced digital image by:
   acquiring a plurality of sub-images from the enhanced digital image; and
   determining whether each sub-image of the plurality of sub-images is a human face sub-image according to a pre-trained adaptive boost human face classifier.

11. The device of claim 8, wherein the processor is configured to execute the instructions to perform the facial recognition process on the enhanced digital image by:
   extracting a plurality of sub-images from the enhanced digital image; and
   determining whether each sub-image of the plurality of sub-images is a human face sub-image according to a pre-trained adaptive boost human face classifier.

12. The device of claim 11, wherein the processor is configured to execute the instructions to acquire the plurality of sub-images of the enhanced digital image by:
   traversing the enhanced digital image and defining an image area of a sub-image based on a boundary of a sliding window, wherein each traversal iteration of the sliding window results in a different sized sliding window boundary.

13. The device of claim 11, wherein the pre-trained adaptive boost human face classifier is formed as a cascade of a plurality of classifier stages;
   wherein determining whether each sub-image is the human face sub-image according to the pre-trained adaptive boost human face classifier comprises:
      determining whether the sub-image is the human face sub-image in a stage by stage manner starting from a first classifier stage to a last classifier stage in the pre-trained adaptive boost human face classifier; and
      determining that the sub-image is the human face sub-image when each resulting output from all classifier stages of the pre-trained adaptive boost human face classifier indicates that the sub-image is the human face sub-image.

14. The device of claim 11, wherein the processor is configured to execute the instructions to determine the identity of the human face in the digital image according to the result of the facial recognition process by:
   when a sub-image includes a human face sub-image, determining a position of the sub-image including the human face sub-image in the digital image; and
   recognizing a human face in the digital image according to the position of the sub-image which is the human face sub-image in the digital image.

15. A non-transitory computer-readable storage medium having stored therein instructions that, when executed by a processor of a device, causes the device to perform a facial recognition method, the method comprising:
   determining that an edge area of a digital image includes image data representative of a portion of a human face;
   adding a specified numeric pixels to the edge area of the digital image, the specified numeric pixels each having a same pixel value as each other, wherein the same pixel value is determined based on pixel values corresponding to image data representing the human face;
generating an enhanced digital image based on adding the specified numeric pixels to the edge area of the digital image;
implementing a facial recognition process on the enhanced digital image; and
determining an identity of a human face in the enhanced digital image according to a result of the facial recognition process.

* * * * *